United States Patent
Doray et al.

(10) Patent No.: US 9,207,833 B2
(45) Date of Patent: Dec. 8, 2015

(54) COLLABORATION SYSTEM

(71) Applicant: Apple, Inc., Cupertino, CA (US)

(72) Inventors: Bernard Doray, Nepean (CA); Paul To, Menlo Park, CA (US); Michael Haller, Linz (AT); Peter Brandl, Linz (AT); Thomas J. Seifried, Linz (AT)

(73) Assignee: APPLE INC., Cupertino, CA (US)

( * ) Notice: Subject to any disclaimer, the term of this patent is extended or adjusted under 35 U.S.C. 154(b) by 375 days.

(21) Appl. No.: 13/779,058

(22) Filed: Feb. 27, 2013

(65) Prior Publication Data
US 2013/0227433 A1 Aug. 29, 2013

Related U.S. Application Data

(66) Division of application No. 12/567,481, filed on Sep. 25, 2009, now Pat. No. 8,402,391, Substitute for application No. 61/100,066, filed on Sep. 25, 2008.

(51) Int. Cl.
| | |
|---|---|
| *G06K 9/22* | (2006.01) |
| *G06F 3/0481* | (2013.01) |
| *G06F 3/0482* | (2013.01) |
| *G06F 3/0488* | (2013.01) |
| *G06Q 10/10* | (2012.01) |
| *H04L 29/06* | (2006.01) |

(52) U.S. Cl.
CPC ............ *G06F 3/0481* (2013.01); *G06F 3/0482* (2013.01); *G06F 3/04883* (2013.01); *G06Q 10/103* (2013.01); *G06F 2203/04807* (2013.01); *H04L 65/403* (2013.01)

(58) Field of Classification Search
CPC .................................................. H04L 65/403
USPC ............................ 345/179; 382/314; 715/753
See application file for complete search history.

(56) References Cited

U.S. PATENT DOCUMENTS

| | | | |
|---|---|---|---|
| 7,454,977 B2* | 11/2008 | Larsen et al. ................... 73/763 |
| 8,140,980 B2* | 3/2012 | Gunasekar et al. ........... 715/753 |
| 8,275,197 B2 | 9/2012 | Hawkins et al. |
| 8,316,089 B2 | 11/2012 | Thakkar et al. |
| 2002/0031243 A1* | 3/2002 | Schiller et al. ............... 382/119 |
| 2004/0054802 A1* | 3/2004 | Beauchamp et al. ......... 709/238 |
| 2004/0133639 A1* | 7/2004 | Shuang et al. ................ 709/204 |
| 2006/0181525 A1* | 8/2006 | Larsen et al. ................. 345/179 |
| 2007/0216660 A1 | 9/2007 | Sposato et al. |
| 2009/0210491 A1 | 8/2009 | Thakkar et al. |
| 2009/0210789 A1 | 8/2009 | Thakkar et al. |
| 2009/0254839 A1 | 10/2009 | Kripalani et al. |
| 2009/0282103 A1 | 11/2009 | Thakkar et al. |

(Continued)

*Primary Examiner* — William Titcomb
(74) *Attorney, Agent, or Firm* — Morgan, Lewis & Bockius LLP

(57) ABSTRACT

A collaboration system provides enhanced user interface to enable users to interact with electronic devices. In one embodiment, users can add content to a digital system by using a pen that streams coordinates so that input to the digital system may be based on conventional pen and paper handwriting. In another embodiment, a pie-based menu system is used for input to large display area digital devices in which an occluded portion of the pie-based menu system is not used for direct input by the user. The selection of which areas of the pie-based menu system should be omitted from use is adaptive and responsive to whether the user is left-handed or right-handed, and the wrist angle defined by the user's posture. In still another embodiment, an ergonomic open-shaped pie menu system is provided to facilitate selection of options on a digital surface.

18 Claims, 16 Drawing Sheets

(56) References Cited

U.S. PATENT DOCUMENTS

| | | |
|---|---|---|
| 2009/0300520 A1 | 12/2009 | Ashutosh et al. |
| 2009/0309956 A1 | 12/2009 | Hawkins et al. |
| 2009/0315864 A1* | 12/2009 | Silverbrook et al. ......... 345/179 |
| 2009/0319916 A1 | 12/2009 | Gudipaty et al. |
| 2010/0129006 A1* | 5/2010 | Silverbrook et al. ......... 382/314 |
| 2011/0208807 A1* | 8/2011 | Shaffer ......................... 709/203 |
| 2014/0032677 A1* | 1/2014 | Pittenger et al. .............. 709/205 |

* cited by examiner

COLLABORATION SYSTEM

CROSS-REFERENCE TO RELATED APPLICATIONS

This application is a divisional of U.S. patent application Ser. No. 12/567,481 entitled "Collaboration System" to Doray et al. filed Sep. 25, 2009, which claims priority to U.S. Provisional Patent Application No. 61/100,066, filed Sep. 25, 2008, entitled "Occlusion—Aware Menu Design for Digital Tabletops", both of which are hereby incorporated herein by reference.

TECHNICAL FIELD

The present invention relates to collaboration systems and, more particularly, to a method and apparatus for facilitating collaboration.

BACKGROUND

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

Data communication networks are frequently used to interconnect people to enable them to collaborate on projects from different geographic locations. For example, in a business context, people from a given company may be physically located at different offices but may be working together on a common project. Thus, the people will need to collaborate with each other to discuss problems associated with the project and to collectively find solutions to the problems.

Data communication networks facilitate collaboration in many ways. Initially, communication networks were used to convey voice between participants so that multiple people could talk to each other on a conference call. Over time, the basic voice conference call has been extended to also include video conferencing and other types of conferencing systems.

When people meet to collaborate on a project, it is possible for the people to become distracted and unfocused. Accordingly, various business tools have been developed to help lead business meetings to help participants stay focused on the intended topic. Examples of business tools of this nature include whiteboards and flip charts. These business tools, when properly used, can help focus a group of people on a small set of topics by providing a way for the moderator of the meeting to keep returning the participants' attention to the main theme of the meeting. For example, by interrupting and requesting a person to succinctly state their thought, and then writing the thought on the whiteboard, the moderator may focus the person's attention and return to the main objectives of the meeting. Whiteboards may also be used to enable people to brainstorm solutions to a particular problem, vote on the various solutions, and otherwise record the content of the meeting. Myriad uses for white boards have and may be developed.

When not everyone is in the same room, it is possible for the remote participants to look at an electronic whiteboards which may be run as an application on a personal computer. The electronic whiteboard may be used in a manner similar to conventional physical whiteboards, except that the participants are not required to be in the same room.

Whiteboards have also changed from being flat white boards on which participants could write using erasable markers, to the point where they are now being implemented using large digital surfaces. These same types of large digital surfaces are also being used to implement tabletop surfaces or other horizontal surfaces to let users input and view content on the table rather than requiring the users to look up at a wall. As these systems become more prevalent, it would be advantageous to provide a manner for remote participants to collaborate with people geographically located with the large digital surface. Similarly, it would be advantageous to provide a more optimal way for users to access functions associated with programs running on the large digital surface.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A collaboration system provides enhanced user interface to enable users to interact with electronic devices. In one embodiment, users can add content to a digital system by using a pen that streams coordinates so that input to the digital system may be based on conventional pen and paper handwriting. In another embodiment, a pie-based menu system is used for input to large display area digital devices in which an occluded portion of the pie-based menu system is not used for direct input by the user. The selection of which areas of the pie-based menu system should be omitted from use is adaptive and responsive to whether the user is left-handed or right-handed, and the wrist angle defined by the user's posture. In still another embodiment, an ergonomic open-shaped pie menu system is provided to facilitate selection of options on a digital surface.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
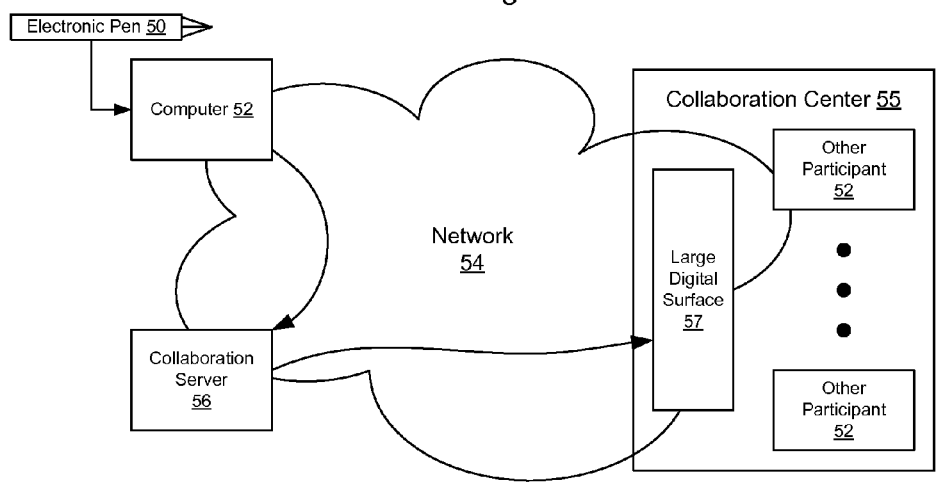
FIG. 1 is an example network that may be used to implement a collaboration system according to an embodiment of the invention.

FIG. 1 illustrates an embodiment of the invention in which an electronic pen is used to enable users to interact with other users in a collaborative manner. Specifically, as shown in FIG. a person using an electronic pen 50 is remotely located from other participants and, hence, cannot directly interact with those participants. According to an embodiment of the invention, the electronic pen 50 can enable the user to interact with the other participants 52 in a collaboration center 55 over a network 54.

Figure 2:
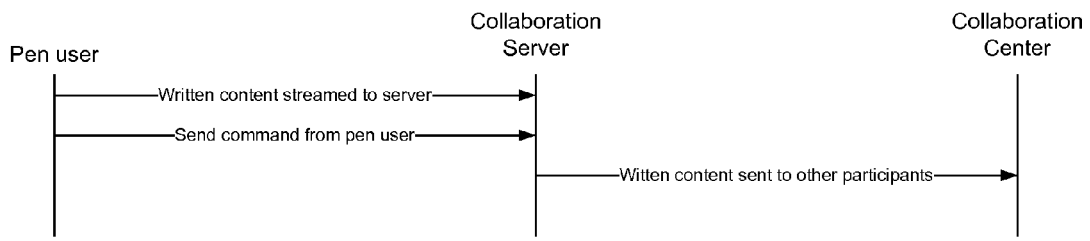
FIG. 2 is a flow diagram illustrating the flow of information in the reference network of FIG. 1 according to an embodiment of the invention.

As shown in FIG. 2, the pen user uses the electronic pen 50 to write on a special pad of paper or on ordinary paper depending on the type of electronic pen being used. The written content is stored in the electronic pen and, on demand, streamed from the pen to a collaboration server 56. Where the pen is configured to stream the information over the network to the collaboration server directly, it may do so. Alternatively, the electronic pen may stream the information to a computer 58 or other handheld electronic device associated with the pen user which may process the data and/or relay the data to the collaboration server 56. The collaboration server 56 interprets the pen strokes from the electronic pen and provides an updated output to the other participants 52 participating in the collaboration session by causing the updated content to appear on a large digital surface 57 physically present with the other participants in the collaboration center 53. For example, if the electronic pen user draws an image, the image may be shown to the other participants on the large digital surface in the collaboration center. Alternatively, if the pen user invoked a function such as voted on an item, the pen user's input will be provided to the other participants to show an updated collaboration view.

In one embodiment, an electronic pen such as an Anoto™ Pen may be used to interact with the collaboration system. Anoto pens use special pads of paper and optical recognition to determine where the pen is on a piece of paper and stream coordinates (wirelessly or via a USB cable) using a proprietary format. Software on the computer receives the coordinates and translates the pen motion into text or graphics. Alternatively an IOGear pen such as the Mobile Digital Scribe™ may be used to electronically stream coordinates of the pen strokes (which are made on paper) to a computer. The Mobile Digital Scribe will store handwritten notes, drawings, etc., for later transfer to a computer for storage or rendering.

The electronic pen has an ink reservoir and a nib that enables ink to be dispensed while the user moves the nib across the paper. Thus, the user is provided with feedback in the form of lines on the paper. In this regard, the pen operates as a normal pen such that the user may use the pen to draw figures and words on normal paper. However, the user's pen strokes are also captured electronically and transmitted on a network to collaboration software that enables the user's input to be captured and provided to the other participants. Likewise, the user's input may be recorded if the session is being stored, so that the user's input may be memorialized without requiring further action by the user or other participants.

For example, an electronic whiteboard application may be used as a shared application which may be viewed and interacted with by participants. The participants can be local, i.e. located in the room with a large digital surface showing an instance of the electronic whiteboard, or may be remote and interface with the electronic whiteboard over a network. In one embodiment participants m a collaborative session can interact and share content electronically through the use of an electronic pen and paper. Participants write on paper with an electronic pen. The pen streams the coordinates of the pen stroke corresponding to what is being written on paper to a collaboration server. The computer system can then share this written information to the participants connected to the same collaborative session via a computer or some other electronic device. For example, the coordinates may be received and transferred on a wireless network by the user's handheld wireless device (e.g. cell phone, Blackberry, Personal Data Assistant PDA).

When the written content is received, it can be shared with the other participants either in real-time or only when the pen-user taps on a specially designated region of the paper sheet or form.

Use of an electronic pen as an input mechanism is simple and natural for users, since writing using pen and paper is ubiquitous and familiar for most individuals. Additionally, when compared with the use of a tablet Personal Computer (PC), the use of an electronic pen is much more cost effective since table PCs are expensive to purchase and maintain. By contrast, the electronic pen may connect to an existing computer or handheld wireless device, so that the upfront and operational costs associated with tablet PCs may be eliminated.

In one embodiment, the user's input is not shared in the collaboration session with the other collaboration participants until the user initiates sharing. For example, the electronic pen user may need to tap a particular area of the paper before the content is streamed to the other users. This allows the user to complete a drawing or thought before streaming any content to the other people joined in the collaboration session, to avoid interrupting the collaboration session with partially completed content. When the user initiates sharing, the pen strokes are streamed from the user's pen to a computer system and stored there. The computer system then provides the pen-strokes either directly or in synthesized form to the other participants that are collaborating with the electronic pen user to enable the other participants to see what the electronic pen user has drawn.

There are many uses of this electronic system. For example, in a voting scenario, a ballot form will generally have well defined regions that correspond to each choice for the vote. When the user taps on one of the choices, the electronic pen can stream the pen coordinates to the collaboration system which translates the coordinates into a voting choice. The voting choice will be registered by the collaborative system and tallied with the votes from the other participants in the collaborative session.

As another example, in traditional brainstorming sessions participants are given sticky "post-it" notes to write down their ideas. These ideas are then stuck on a wall and physically moved around to form groups of related ideas. At the end of the brainstorming session these ideas are then manually typed into a computer for sharing. This way of working makes it hard to include remote participants since the remote participant must verbally relay his idea to a local participant so that the local participant can create the paper post-it note that is then added to the wall. Using an electronic pen, the user can write their ideas on specially marked note pads with an electronic pen. When the user taps on specially marked areas on the note page, the idea is uploaded to a virtual wall implemented as a large digital surface. The idea may even be represented on the virtual wall using a virtual "post-it" note. Once the idea is shown on the virtual wall (along with the other ideas that have been posted on the virtual wall) the individual ideas can be moved around with a mouse, light pen, touch, etc., to group similar ideas in a manner similar to what could be accomplished using physical notes in a normal brainstorming session.

Large direct-input tables (horizontal surfaces) and large direct input walls (vertical surfaces) have been developed to enable multiple users to simultaneously provide input to facilitate collaboration. Both horizontal and wall mounted surfaces will be described herein as "large digital surfaces". Large digital surfaces can be optical and/or pressure sensitive to allow users to interact using light pens and/or by touching the surfaces.

Computers are good at facilitating collaboration between people in remote locations, but when people are grouped together computers tend to get in the way of collaboration. Large digital surfaces such as the DiamondTouch table available from Circle Twelve™ facilitate collaboration by enabling multiple users to interact with the same content rather than having each user looking at the content on their own screen. The DiamondTouch table, for example, is a large direct-input table that can distinguish between touches from multiple users simultaneously, thus allowing multiple users to add content to that being shown by the large digital surface.

Frequently, one or more programs will be run on a large digital surface, and users invoke functions on these programs by interacting with application menus. The large digital surface itself may also have one or more available functions as well, and thus may have its own menu system. Thus, users of large digital surfaces will often need to access menus on the large digital surface.

Unfortunately, on large digital surfaces, occlusions created by the user's hand decrease interaction performance with menus. Menus are commonly used to access features available in programs running on a computer system associated with the direct input surface. According to an embodiment of the invention, menus are drawn to avoid the occlusion areas caused by the interaction between the user's hand and the large digital surface. The menus are adaptive according to user's handedness, orientation, and position on the tabletop. The menus may include point and click areas as well as gesture input areas. Optionally, since interaction with the gesture area does not rely on the user's ability to see the menu, the gesture area may be partially or wholly contained within the occlusion area.

Interaction with large direct digital surfaces is strongly influenced by physical restrictions. Reachability of items and obscurations caused by the user's body relative to the surface may make particular menu designs difficult to use. For example, traditional menus are not very well adapted to direct pen or direct hand-screen interaction. Menus that appear on the location where they are activated seem to be a better choice for large interactive surfaces, where the input is normally done with a pen or a direct finger touch. Additionally, different users may prefer to use their right hand to interact with menus, while other users may prefer to use their left hand to interact with menus. This innate preference will be referred to herein as "handedness". The handedness of the user will affect which areas of the large digital surface are obscured when the user attempts to interact with a menu. Likewise the user's posture, which affects the direction in which the user's hand is oriented on the large digital surface while interacting with the menu, will affect which areas of the large digital surface are occluded.

Figure 3:
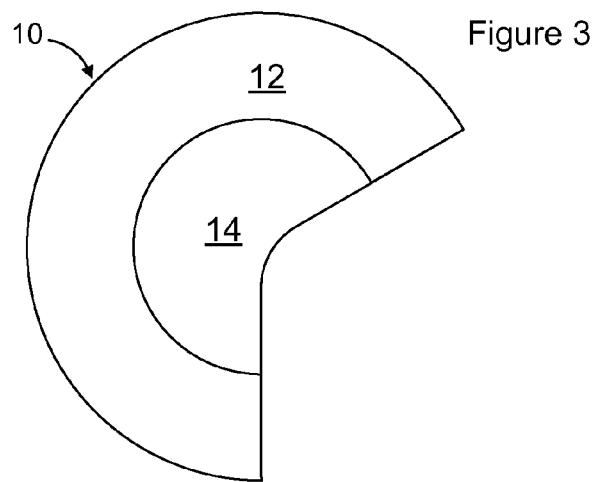
FIG. 3 is a two dimensional representation of a menu design for use with a large digital surface designed for a right-handed user according to an embodiment of the invention.

FIG. 3 shows an example menu adapted for use on a large digital surface according to an embodiment of the invention. As shown in FIG. 3, the menu is configured to incorporate some of the features of a conventional pie menu. However, conventional pie menus extend 360 about a central area. According to an embodiment of the invention, a region of the pie menu that is likely to be occluded by the user's hand is not used for point-and-click interaction.

Figure 4:
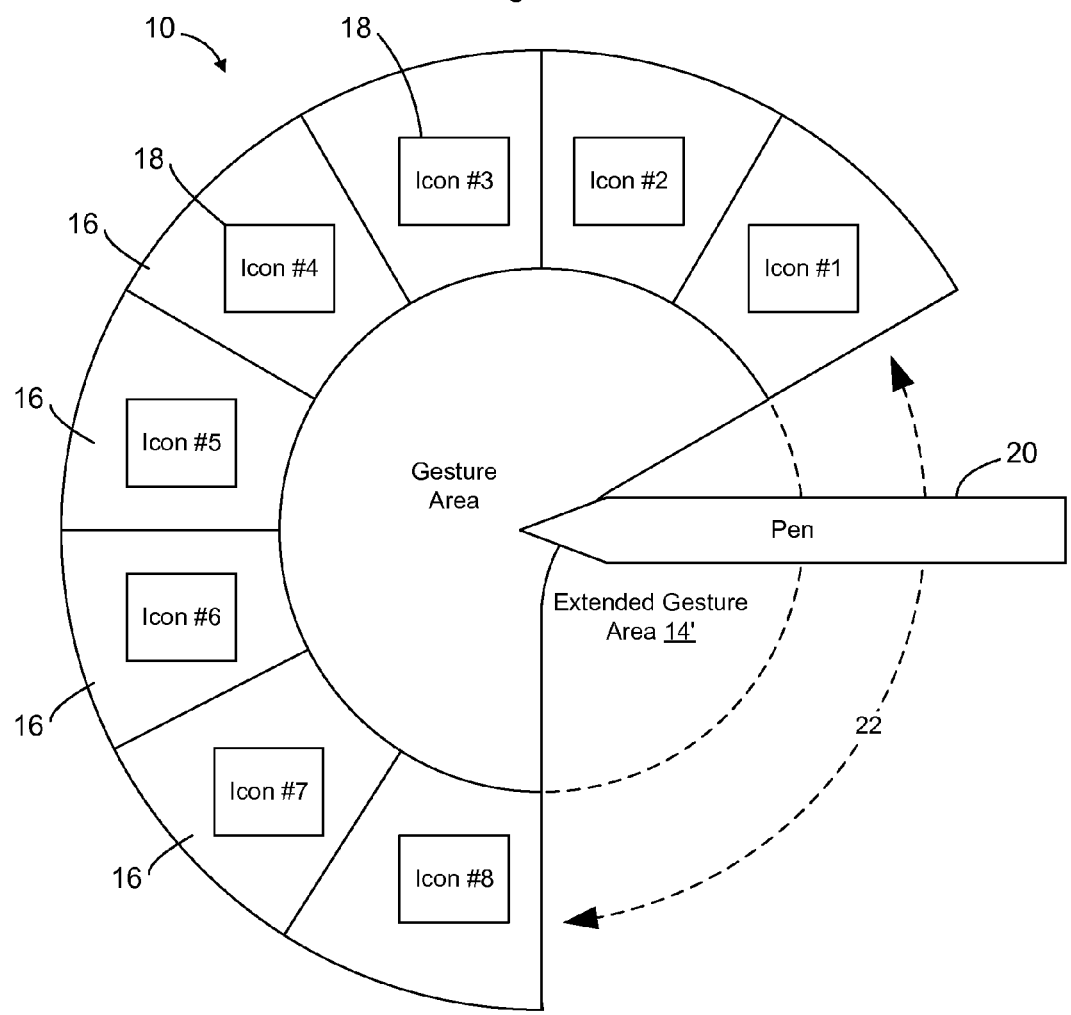
FIG. 4 is a two dimensional representation of the menu design of FIG. 3 in greater detail according to an embodiment of the invention.

For example, as shown in FIG. 3, the menu 10 includes a point and click region 12 and a gesture area 14. The point and click region 12 may be divided logically into a plurality of areas as shown in FIG. 4. Each of the areas may include an icon 18 or other indicia of the function available via that area may be presented to help instruct the user of the function of that point and click area. In operation the user may use a pen 20 or their finger to select one of the icons to cause the function to be executed or to cause a sub-menu to be drawn to make a further selection of functions available to the user.

In the embodiment shown in FIG. an occluded area 22 which is expected to lie beneath the user's hand while the user interacts with the menu 10 is not used to support point and click interactions between the user and the underlying large digital surface. The occluded area, or a portion of the occluded area, may however be used to support an extended gesture area. The gesture area may be used by users to draw lines, select icons, cause new icons to appear, and in other ways. Gesture based icon selection and gesture based scrolling is known in the art and the particular manner in which the gesture area is used would depend on software that the menu was being used to interact with and the type of features/functions available via the menu. Specifically, the menu described herein and illustrated for example in FIG. 4 may be used with a variety of different software programs, and the particular functions supported by the icons would change depending on the functions available in the program. Use of the gesture area would similarly be expected to be correlated with the application so that different gestures may be used differently to interact with different applications in use via the large digital surface.

The occluded area 14 may be used as part of an interactive area for gesture input inside the menu. For example, as shown in FIG. 3 the gesture area may include an extended gesture area 14' which extends into the occluded area 22. Occlusions prevent visual feedback but this is not a problem for gesture based input as long as the gesture area can be recognized, the user knows where he can start a gesture, and the user knows which gestures to use. The outer region of the menu should be used for the items which can be accessed with a simple point-and-click One example for a gesture-based metaphor is a technique in which the curvature of the path created by the pen is tracked and used to scroll content or zoom into the scene, for example. This method tracks the curvature of the path created by the pen and changes the values accordingly. The speed at which the users browse through content is controlled by the radius of the circle drawn: the larger the radius, the slower the increase in the controlled parameter, and the slower the speed of the browsing of content. In the same way, users can change other parameters like stroke width. Another example of a gesture may be to enable users to change pages by sliding the pen from the left to the right in the gesture area of the menu.

Figure 5:
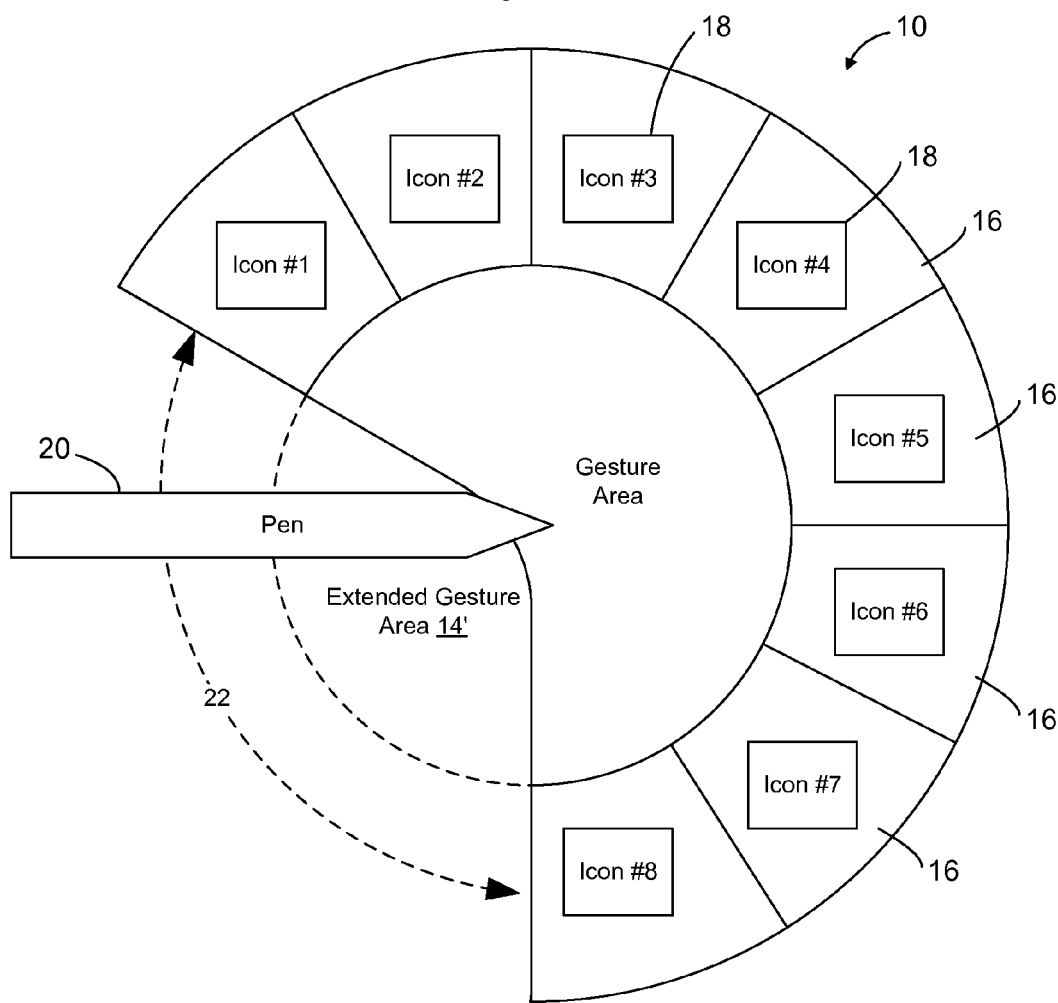
FIG. 5 is a two dimensional representation of a menu design for use with a large digital surface designed for a left-handed user according to an embodiment of the invention.

According to an embodiment of the invention, the orientation of the menu adjusts to make the menu adaptive, so that the occluded area is oriented in the direction of the user's hand when the user is interacting with the large digital surface. FIGS. 4 and 5 show a first way in which the user's hand orientation is used to adjust the location of the occluded area 22. Specifically, FIG. 4 shows a menu that may be drawn for a right-handed user and FIG. 5 shows the same menu when drawn for a left-handed user. As is clear from a comparison of these two figures, a right-handed user is a user that interacts with the large digital surface using their right hand. Accordingly, the area of the large digital surface that will be occluded by a right-handed user will be the area in the lower right-hand area of the circle. Likewise, the area of the large digital surface that will be occluded by a left-handed user will be the area in the lower left-hand area of the circle. FIGS. 4 and 5 show how the menu is adjusted, according to an embodiment of the invention, to accommodate the handedness of the user.

Large digital surfaces such as the DiamondTouch surface are touch sensitive. When interacting with a menu displayed on a horizontal flat surface such as a desk, many people will rest their hand or elbow on the flat surface. According to an embodiment of the invention, the orientation of the menu may be further adjusted to accommodate different postures by comparing the location where the user places their wrist or elbow with a location where the user touches the pen to the large digital surface. Where the user does not rest their hand, the menu orientation may be based on a default direction vector value or may resort to a previous orientation based on a direction vector determined during a previous menu invocation operation when the user did rest his hand on the large digital surface.

Figure 6A:
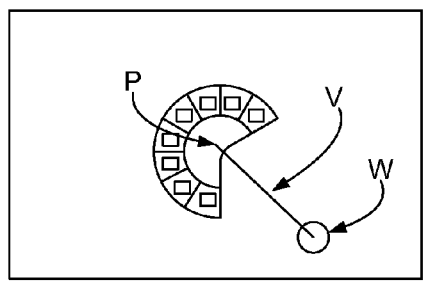
FIGS. 6A-6D show adaptations of a menu according to the user's posture according to an embodiment of the invention.
Figure 6B:
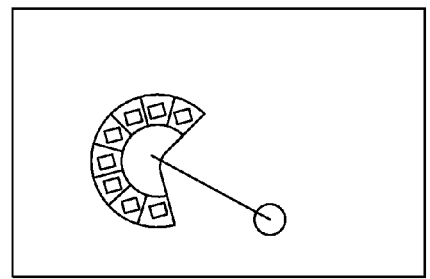
Figure 6C:
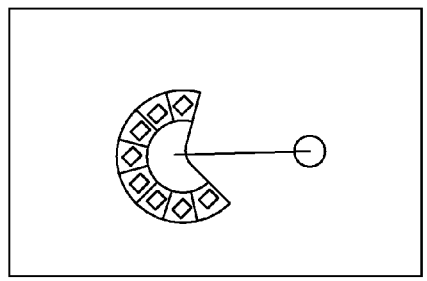
Figure 6D:
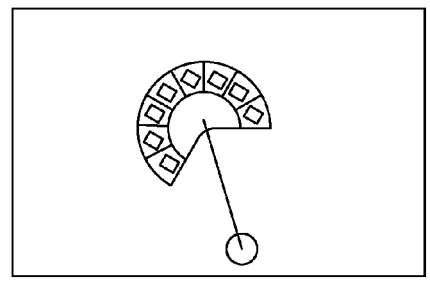

FIGS. 6A-6D show an example of how this may occur. As shown in FIG. 6A, the user's wrist contacts the large digital surface at point W and the pen contacts the large digital surface at point P. A vector V between these two points may be used to adjust the orientation of the occlusion area 22 such that the occlusion area is relatively constantly located relative to the vector. Note, in this embodiment, that the menu is drawn to be centered on the place where the pen contacts the digital surface. By causing the occlusion area to be relatively constantly oriented about the vector from the wrist location to the pen location, the user's hand should be approximately located over the occlusion area 22 regardless of how the user holds the pen and regardless of the user's wrist posture.

The menu is centered on the pen's position and, in this embodiment, rotated with the information of the direction vector. This provides two advantages: First, this allows the menu to automatically adapt for left and right-handed users, as the menu rotates according to the direction vector from hand to pen. Second, the orientation is correct from any perspective on the tabletop and occlusions are avoided. If the user does not contact the tabletop with their wrist, another method such as shadow-tracking could also be used to determine a direction vector. Alternatively, a default direction vector or previous direction vector may be used to establish the orientation of the menu for the user.

Figure 7:
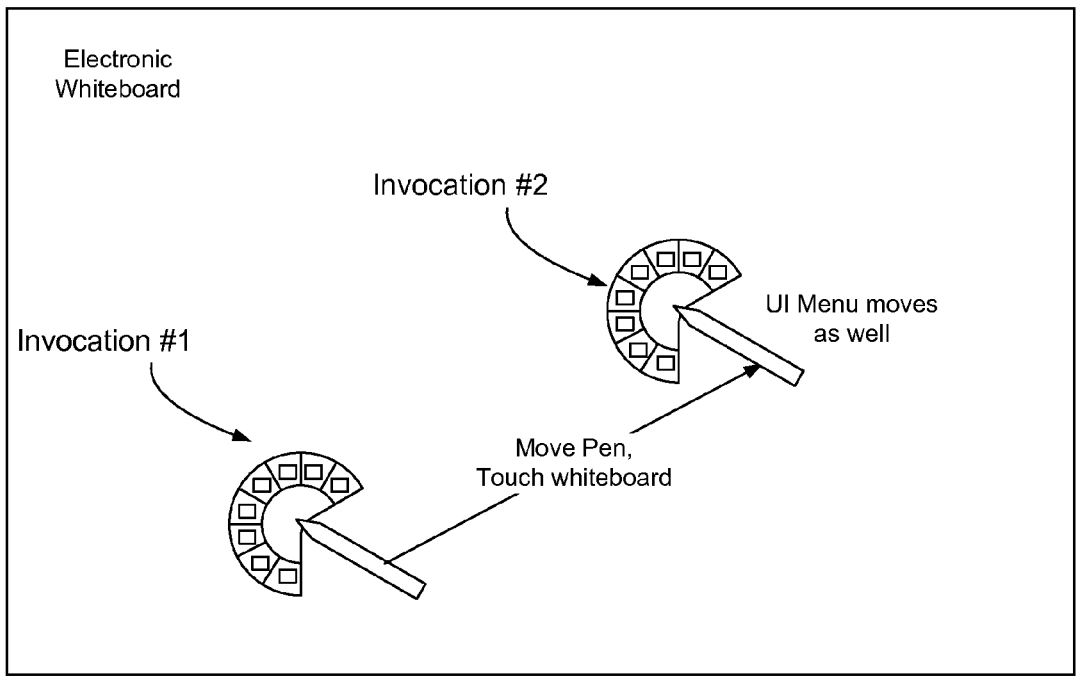
FIG. 7 is a two dimensional representation of the menu showing relocation of the menu design depending on location of an input device according to an embodiment of the invention.

FIG. 7 shows an example of how the large digital surface can present the user with a menu. Specifically, as shown in FIG. 7, the menu 10 will be drawn at a location surrounding the user's pen tip when invoked. Thus, for example, if the user invokes the menu at a first location, moves their pen, and invokes the menu a second time, the menu will be drawn to surround the pen-tip where ever invoked by the user.

A pen may be used by a user for many purposes, such as to draw pictures on the large digital surface, write text, add notes, move items, etc. Most of these operations do not require the menu to be invoked. Accordingly, the simple act of touching the pen to the table surface should not be interpreted as an instruction to invoke the menu. However, there are times when the user will need to invoke the menu.

If the pen has an integrated button, this can be used to achieve the same effect as a right mouse button click. But as not all pens offer an additional button and, hence, it should be possible to invoke a menu without relying on using a special button on the pen. The double click invocation is well known from mouse based applications. The important characteristics for a double click are two down events in a certain lapse of time and within a spatial area. Unfortunately, basing a menu invoke operation on two down events when using a pen can be ambiguous, depending on the application context in which the double click is used to active a pie menu. For example, if handwriting is the main task with the pen, it can be difficult to distinguish between a double-click menu-invoking event and writing colons on the page.

According to an embodiment of the invention, the double-click (two down actions with a pen) is extended so that, with a pressure-sensitive pen interaction, rather than using two down motions to invoke a menu, a single down event followed by two presses without an intervening up-event is used to invoke the menu. In this embodiment each press on the pen tip has to exceed a predefined threshold to be recognized. As with the double click, the sequence has to be performed in a certain lapse of time and within a spatial area. One advantage of double pressure over double click is the more stable position of the pen during this action. Double click requires lifting the pen between the two clicks, double pressure assumes the pen is at a fixed position within some tolerance. Although the double pressure event described herein has been described in connection with invoking a menu, it may be possible to use this type of interaction more generically to invoke other actions other than activating the pie menu.

Figure 8:
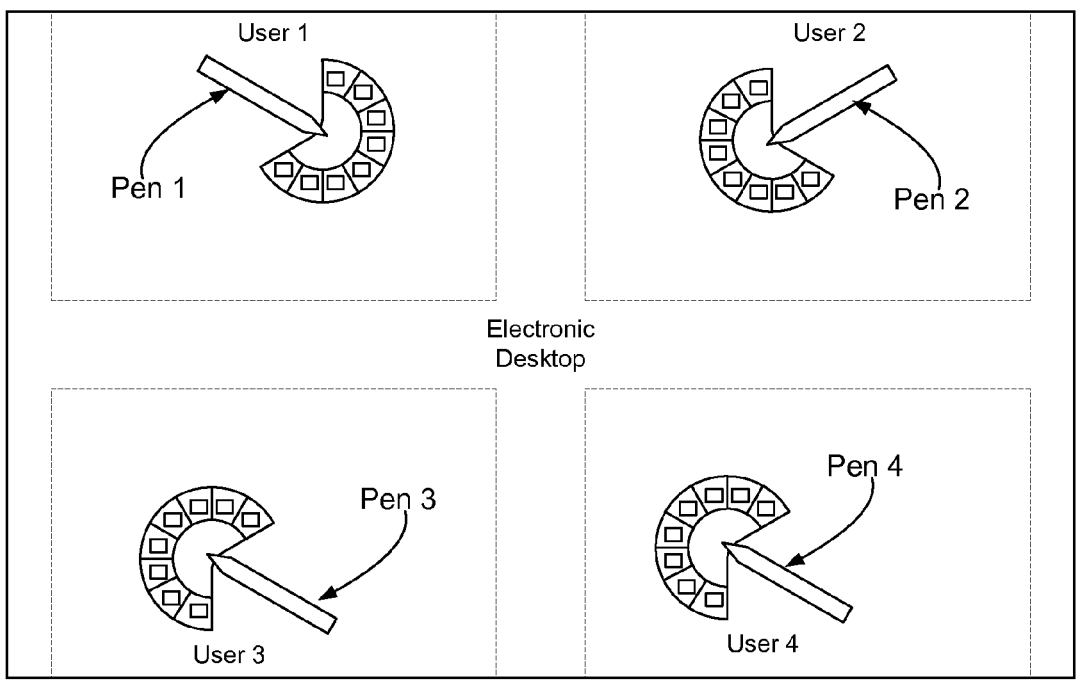
FIG. 8 is a two dimensional representation of a large digital surface with multiple left and right-handed menu designs implemented for multiple users according to an embodiment of the invention.

FIG. 8 shows an example large digital surface embodied as an electronic table. Four users are spaced around the large digital surface, each of which has its own pen. Some digital surfaces have pens assigned to particular locations while others enable pens to be assigned to particular users. When each user sits down at the electronic desktop, the user may initiate use of the pen to specify, for example, whether they are left-handed or right-handed. Each user may then invoke a menu by utilizing an invocation action as described above. For example, FIG. 8 shows 4 users simultaneously invoking menus in their respective area of the electronic desktop. In this example, users 1, 3 and 4 are right-handed and user 2 is left-handed.

Digital pens such as Anoto pens have an ID associated with them that may be recognized by the large digital surface. Upon invocation, the large digital surface will draw a separate menu for each pen individually. Hence, multiple users may interact with the large digital surface simultaneously. Due to the adaptive placement (use of vectors to orient the menus), the menu will be oriented towards the user independent of the user's position around the large digital surface. Each pie menu stores its user's specific settings and, when the user invokes the menu, the menu will be drawn using these stored values.

Figure 9:
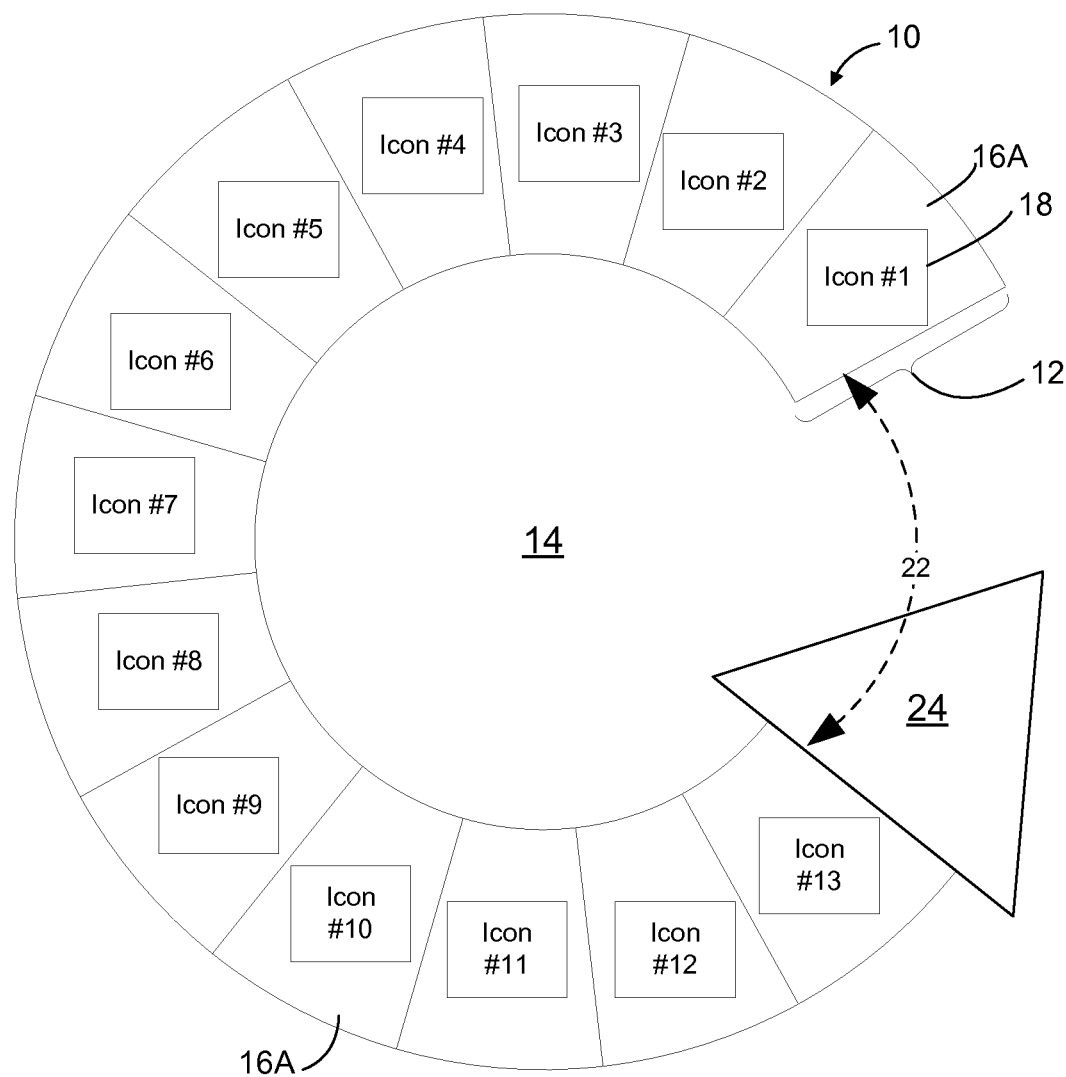
FIG. 9 is a two dimensional representation of another menu design for use with a large digital surface designed for a right-handed user according to an embodiment of the invention.

FIG. 9 shows another example menu 10 having the same basic structure as the menu of FIGS. 4 and 5, and including a point-and-click area, a gesture area, and an occluded area 22. As with the embodiment shown in FIGS. 4-5, the occluded area causes the point-and-click area to be implemented as a circle segment rather than as a full circle so that point-and-click regions are not provided in an area that is expected to be below the user's hand as the user interacts with the menu.

Figure 10:
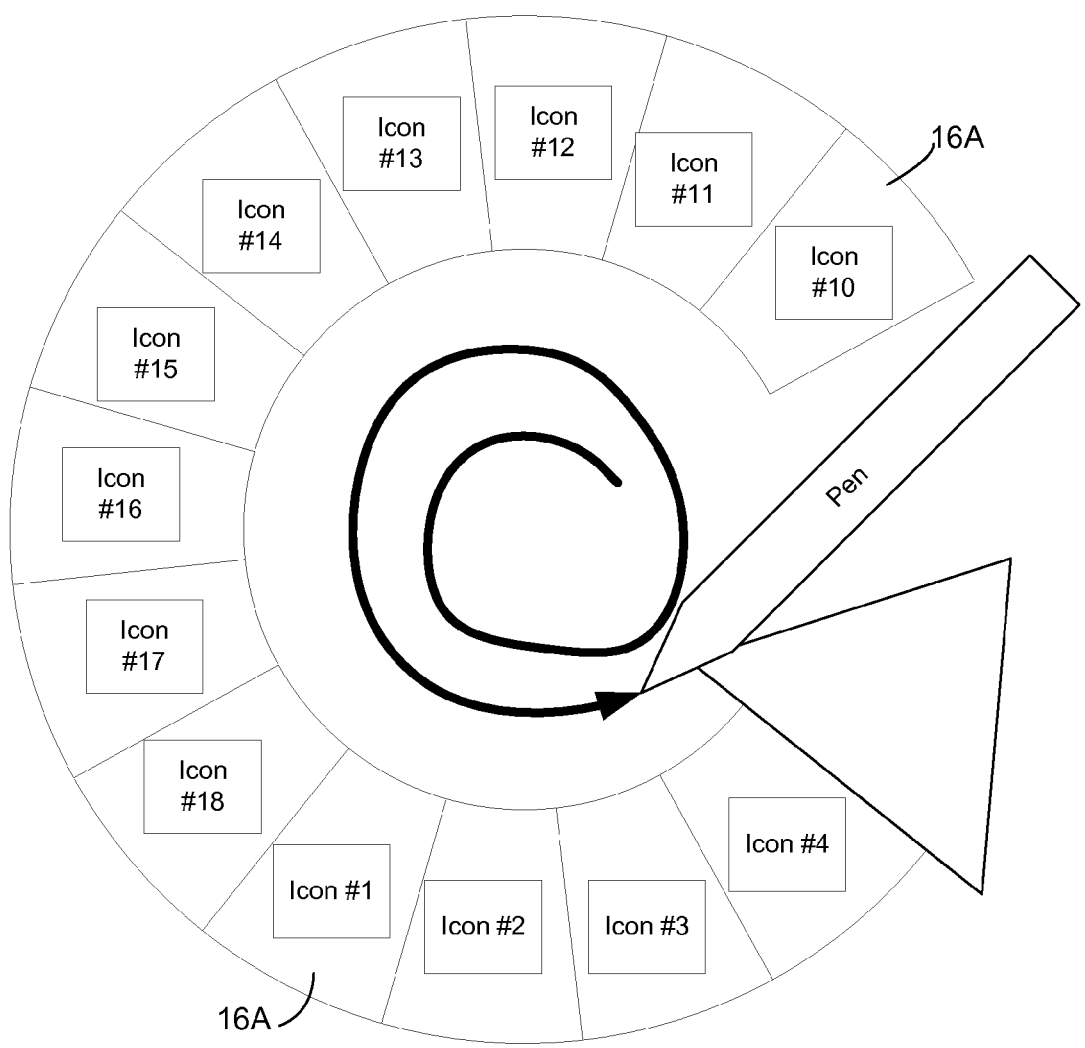
FIG. 10 is a two dimensional representation of yet another menu design for use with a large digital surface designed for a right-handed user and incorporating a scroll function according to an embodiment of the invention.

The example shown in FIG. 9 further includes an arrow 24 within the occluded area that may be used to cause the icons shown in the regions 16 of the point-and-click area 12 to scroll. Scrolling as used herein refers to causing the icons to rotate around the circle to cause the icons to occupy different regions within the point and click area of the menu. FIG. 10 shows another embodiment where the scrolling action is controlled using a spiral gesture in the gesture area 14.

FIGS. 9-10 show conceptually how icons can scroll through the regions around the segment forming the point and click area 12. Specifically, in FIG. 9, icon #1 is displayed in region 16A. After interaction such as by taping the pen inside the region defined by the arrow 24 or drawing a circular gesture in the gesture area 14, the functions have scrolled such that icon #1 has been from its location in region 16A in FIG. 9 to region 16B in FIG. 10. All of the other icons have similarly been moved counterclockwise by 18 positions. In this example, as shown in FIG. 10, there are eighteen icons that may be displayed in the regions 16 of the menu 10. Other numbers of icons could be used. By scrolling the functionality, a larger number of functions may be made available via a smaller number of regions 16.

Figure 11:
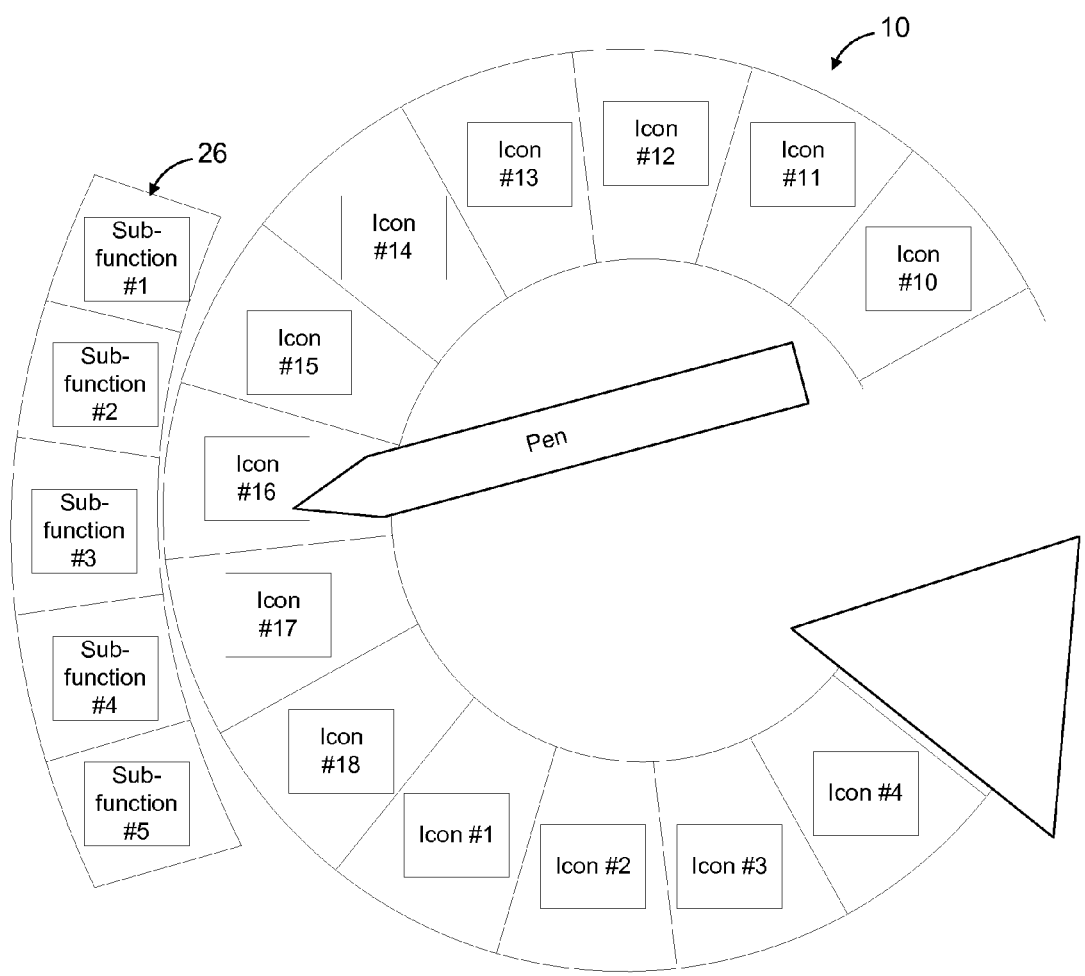
FIG. 11 is a two dimensional representation of a menu design for use with a large digital surface illustrating display of sub-menus.
Figure 12:
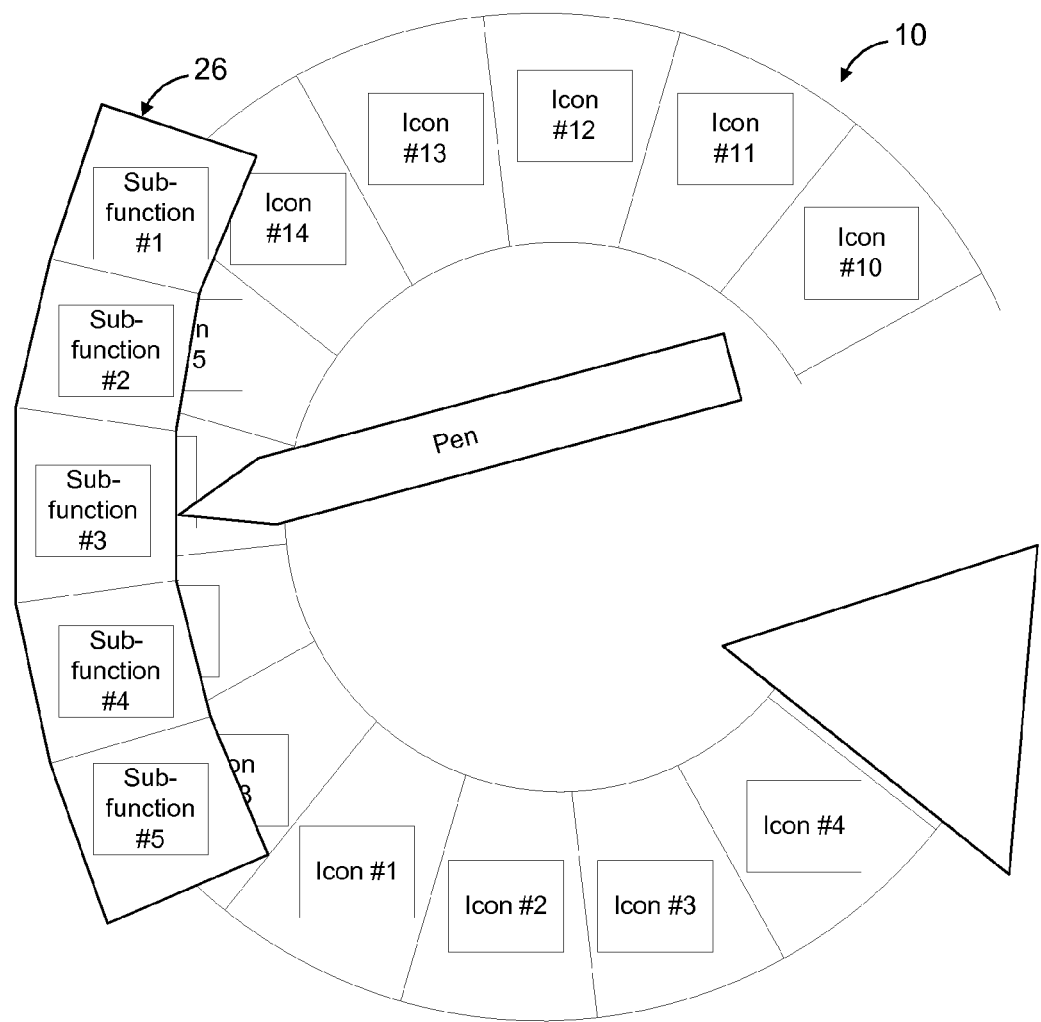
FIG. 12 is a two dimensional representation of a menu design for use with a large digital surface illustrating display of one sub-menu over layer on top of a main menu.

FIGS. 11 and 12 show example displays of sub-functions that may be invoked when a user selects an icon in one of the point-and-click regions. The difference between FIGS. 11 and 12 is in how the sub-function menu 26 is drawn. Specifically, in FIG. 11 the sub-function menu 26 does not overlap with the main menu whereas in FIG. 12 the sub-function menu is overlayed on top of the main menu. The sub-function menu may extend up, down, to the side, or may be centered over the main function region 16 used to invoke the sub-function menu. Optionally the region associated with the main functional icon may be highlighted to further visually show the user which icon has been selected and, hence, enable the user to visually correlate the main function with the sub-functions available via the sub-function menu.

FIGS. 4-5 and 9-10 show pie-shaped menu embodiments implemented to have the direct pen input area (point and click area 12) extend differing amounts around the circle. Direct pen input areas in this explanation are areas where a user can use the pen to select a particular function. Indirect pen input areas, such as gesture areas, are in contrast with direct pen input areas and are areas where the user cannot invoke a particular function but rather the user can control which functions are available on the menu and optionally the shape of the menu itself. In one embodiment, the occlusion area 22 which does not contain any direct pen input areas extends for approximately 90 degrees, and more preferably 92 degrees (out of 360 degrees of the circle). Other sized occlusion areas are possible as well. For example, in FIGS. 3-4 the occlusion area extends almost 135 degrees. Since a human hand will occupy a relatively large angular space when placed close to the center of a circle, preferably the occlusion area is not less than about 75 degrees.

The functions to be placed on the menus may be selected such that more frequently used functions are made available via the icons in regions 16 and the less frequently used functions are available via sub-menus 26. For example, the "undo" function may be frequently used and thus may be included as a top level function (a function placed in one of the regions 16). Indeed, this function and possibly a small set of other functions may be so frequently used by users that these functions may be permanently located in particular regions 16 and not move, even if the menu supports scrolling as shown in FIGS. 9 and 10. Thus, the scrolling function shown in connection with FIGS. 9 and 10 need not cause all functions to scroll, but rather may have particular regions that maintain the same function even when the user interacts with the arrow or gesture region to cause the function of the other regions to change.

Depending on the resolution of the large digital surface, the size of the menu may need to be drawn relatively large to enable users to see the icons with sufficient clarity to ascertain the function. When the users are standing in front of a large digital surface such as an electronic white-board, the use of large icons is less problematic since the user can simply use his arm to reach a necessary distance to select the correct functional icon. On a horizontal large digital surface, the user is more likely to be resting his wrist on the surface of the large digital surface. This makes it less convenient for the user to reach to access particular icons. To make the menu more convenient for use, the size of the menu, including the diameter of the pie menu and the percentage occlusion (amount of the area 22 that is not used for direct pen input) may be customized for individual users to enable the users to specify what their menu should look like to facilitate optimal interaction between the user and the large digital surface.

According to an embodiment of the invention, a modified pie menu is provided in which the selectable regions are ergonomically arranged to conform to the natural range of motion and reach of a user's hand. Since the size of users' hands and wrist flexibility differs greatly, many of the aspects of the ergonomically designed modified pie menu are configurable to more closely comport with the actual range of motion of the user's hand and wrist.

Figure 13:
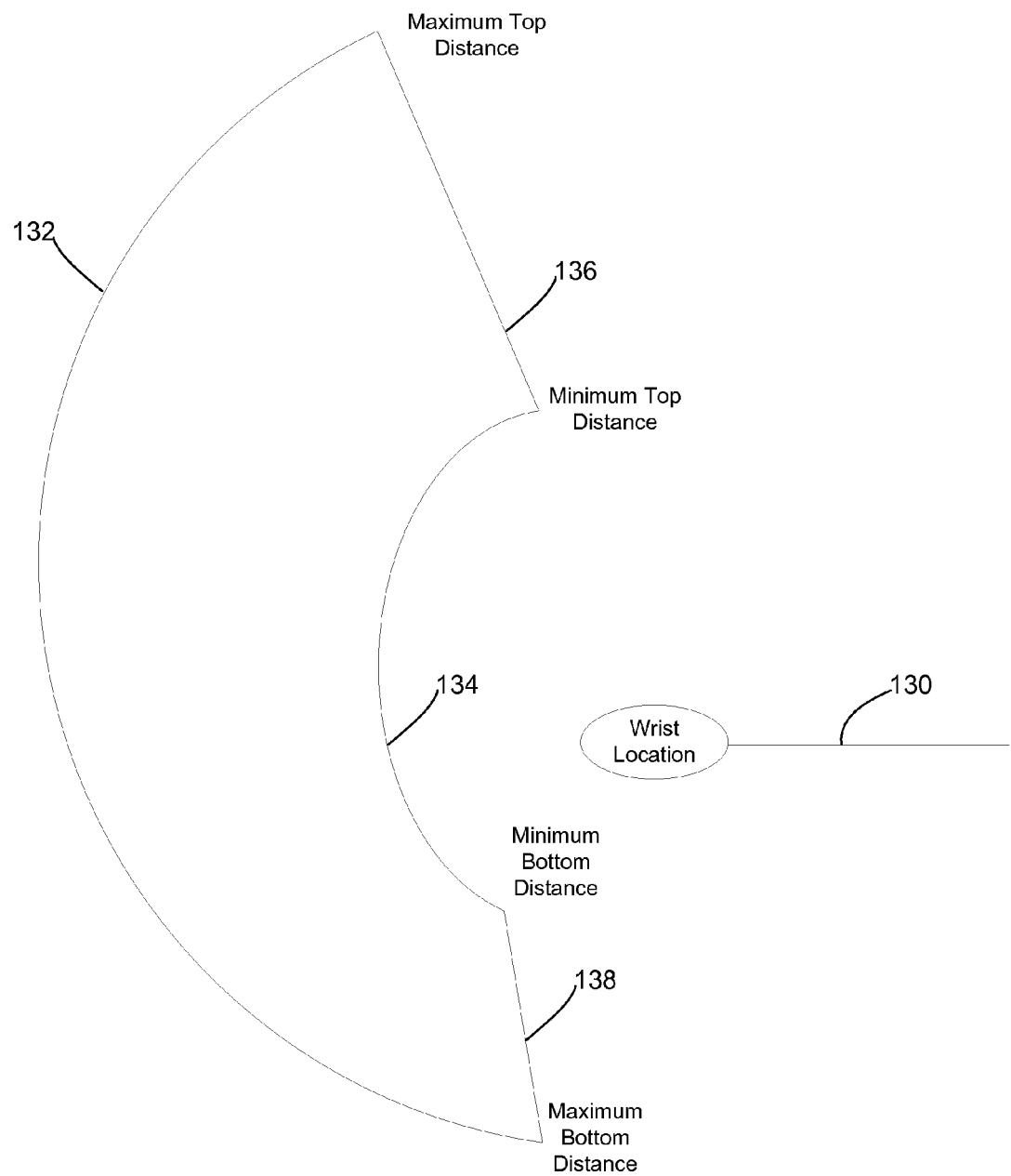
FIG. 13 is a graph showing the range of movement of a user's hand when resting on a surface such as a large digital surface.

FIG. 13 shows the natural range of motion that is comfortable for the wrist of a right-handed person. A mirror image of FIG. 13 would show the range of motion of a person's left hand. As shown in FIG. 13, if a person has their right wrist and forearm aligned generally along line 130, and holds a pen in their right hand, an average person will be able to use a pen to interact within the area defined by the two curved lines 133, 134, in-between lines 136, and 138. Since people's hand sizes vary greatly and their wrist flexibility varies greatly as well, some people will be able to reach close to the maximum top distance while others will only be able to reach to an area close to the minimum top distance. Likewise on the bottom, some people will be able to reach farther than others.

Figure 14:
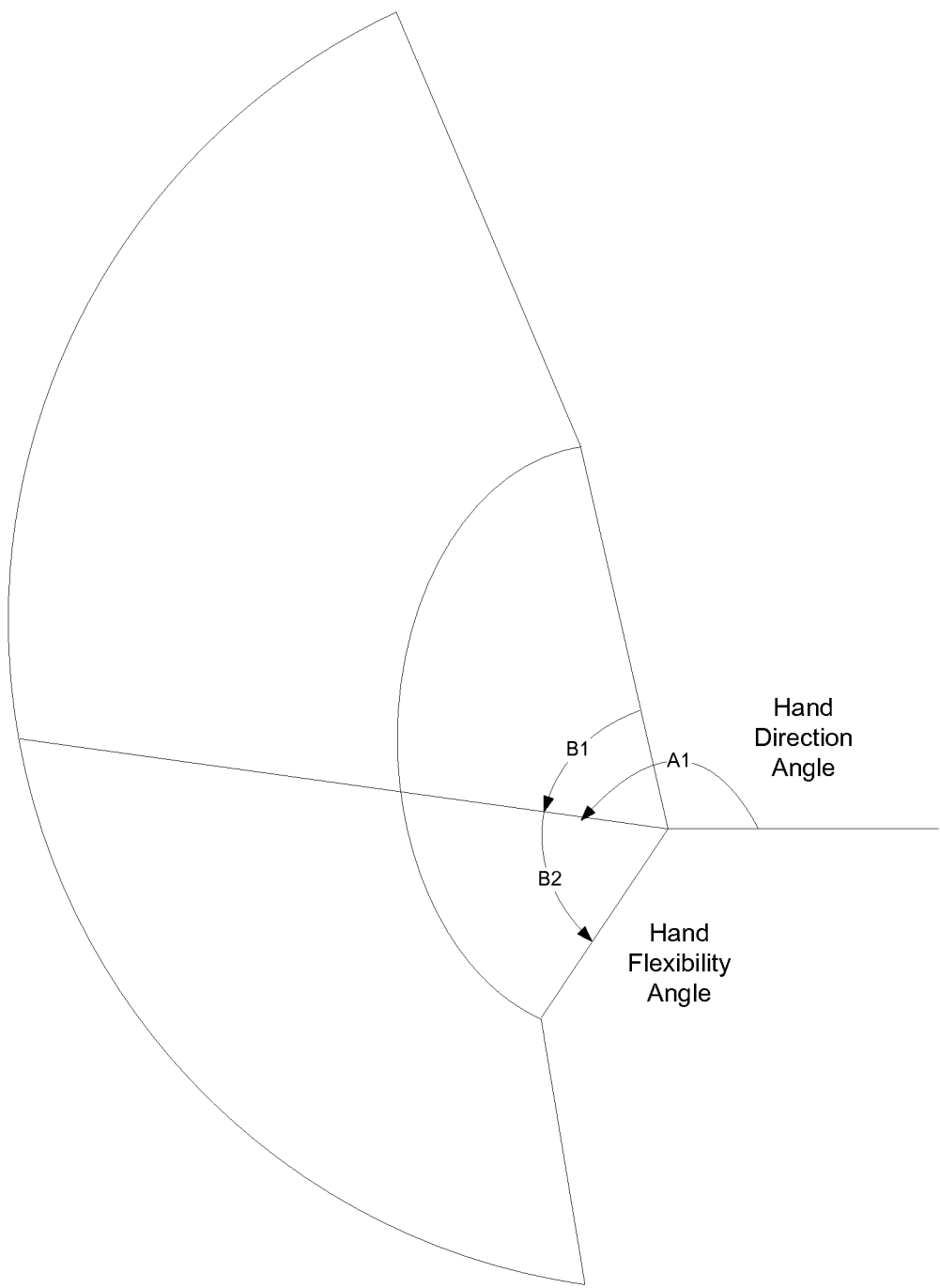
FIG. 14 is a graph showing the range of angle movement of a user's hand when resting on a surface such as a large digital surface

FIG. 14 shows another diagram of the natural range of motion of a person with a stationary hand (reachable area from a fixed wrist position), as would be expected of a user 16 seated at a large digital surface. This figure shows the results of a study that was conducted by having people sit and draw on paper the range of motion that they could comfortably draw without moving their hand.

Participants were seated at a table with large piece of paper in front of them. The paper had a marked position for the wrist. All subjects were asked to rest their hand on that spot, the direction of the arm was not predefined since the participants were intended to use a comfortable natural position rather than a contrived position. The direction of the participant's arm was marked on the paper with a line and the participants were then asked to draw the maximum possible radius without strain. Afterwards, they drew the minimum radius. The final task involved sketching the reachable area with all accessible peaks. A relatively small number of participants were used for the study, so larger groups of participants may result in slightly different values and more precise data.

In this study, the average hand direction angle was 148.28° (with a standard deviation (SD) of 11.05°) for right-handed and 28.17° (SD=13.28°) for left-handed users. The larger standard deviation for left-handed users resulted from fewer left handed users in the study. The hand direction angle A1 is important to correctly place the pie menu on the screen.

The flexibility of the hand was calculated as the average of the reachable angles. An average angle B1, B2 of 82.19° (SD=26.63°) was calculated for all users. In this case, left and right handed users were not distinguished because the direction of the drawing is not relevant for the angle.

The last parameters that define the area that can be reached are the possible minimum and maximum distances, i.e. the distances defined by lines 132 and 134 in FIG. 13. For the outer arc 132, an average maximum bottom distance of 110.94 mm (SD=21.9 mm) was measured, and 131.12 mm (SD=30.0 mm) was measured for the average maximum top distance. The inner arc 134 had an average minimum bottom distance of 69.05 mm (SD=16.41 mm) and an average minimum top distance of 79.74 mm (SD=23.89 mm).

Figure 15:
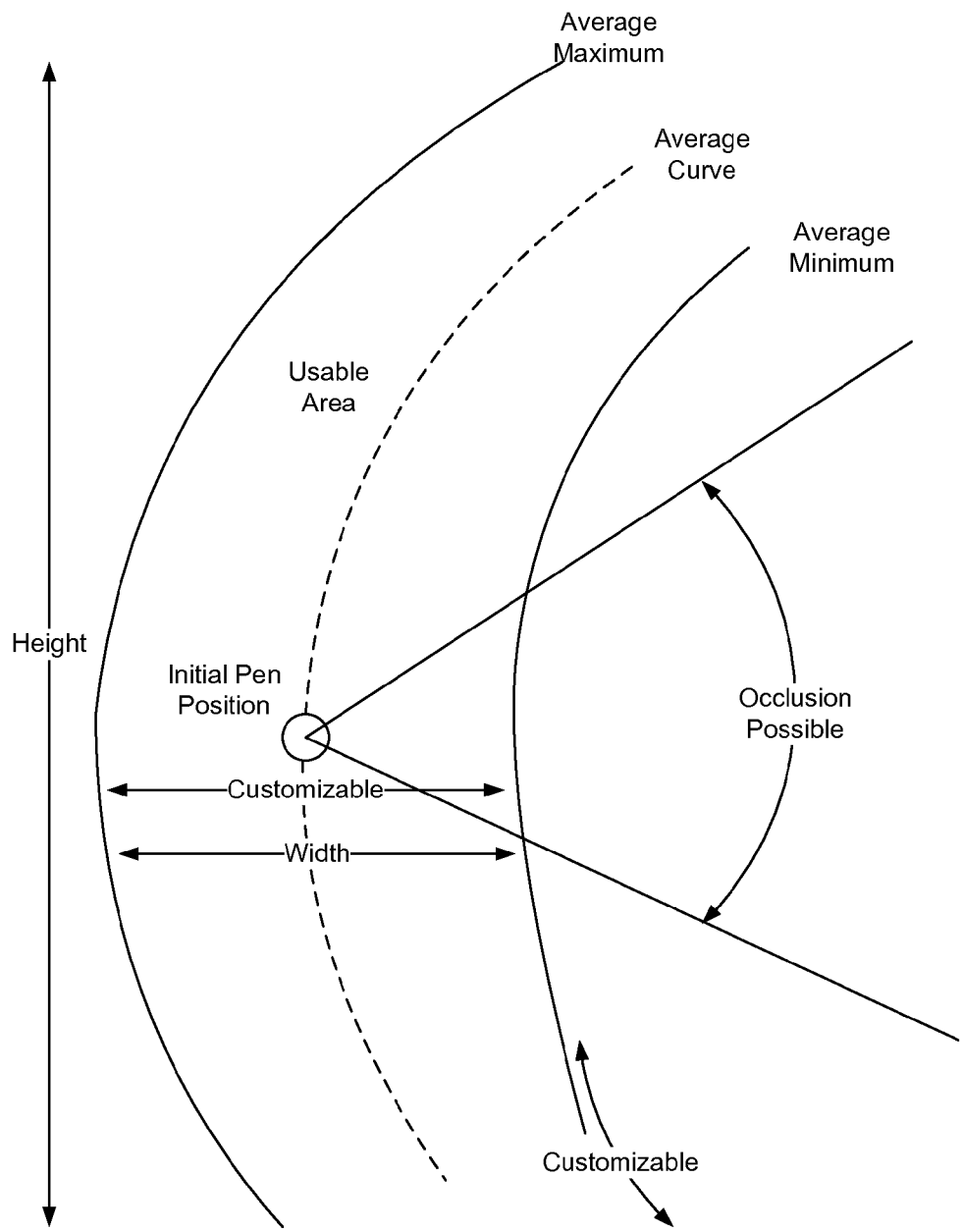
FIG. 15 is a graph showing acceptable area for display of selectable icons in a menu design for use with a large digital surface according to an embodiment of the invention.

Based on these results, it was determined that there are menu design parameters that may be pre-configured and other menu design parameters that should be customizable by the users. FIG. 15 shows these results. As shown in FIG. 15, the hand angle and, hence the occlusion area, may be pre-configured for all users since the hand angle had a relatively small standard deviation. The other factors, such as the difference between the average minimum and average maximum reach (width) should be customizable so that users with different sized hands can easily reach any menu created within the reachable area. Likewise since the wrist flexibility limits may change for different users, the height of the usable area for drawing a menu should also be customizable.

Figure 16:
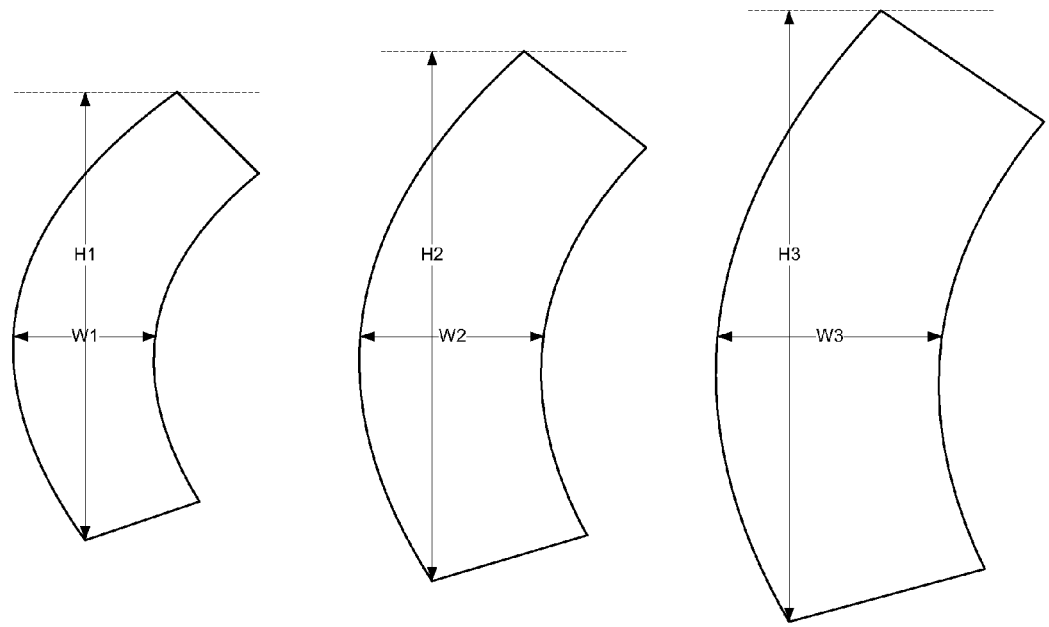
FIG. 16 shows a selection of selectable pre-defined differently sized acceptable areas within which menus may be drawn for users in an ergonomic manner according to an embodiment of the invention.

The user may customize the height and width parameters when they first start using a pen so that any menu drawn for the user is confined to fit within the defined parameters. There are many ways for a user to do this. For example, the user may select between a plurality of menu drawing area sizes as shown in FIG. 16. In this example, the user may be presented with a number of different menu size options such as a small size menu (left figure in FIG. 16), medium size menu (middle figure in FIG. 16), and large size menu (right figure in FIG. 16). By selecting the size of the area in which any menu will be drawn, the user may configure the menu so that all clickable icons drawn in a resultant menu within that area are within easy reach of the user without requiring the user to move his hand.

Figure 17:
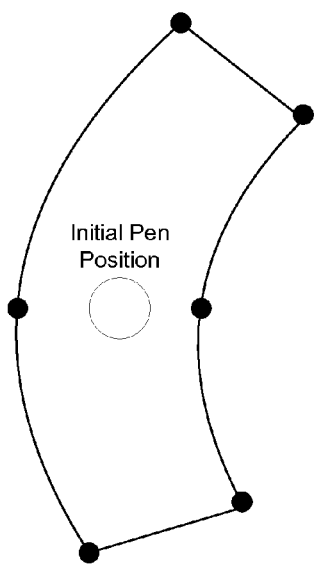
FIG. 17 shows a process that may enable a user to provide input to the large digital surface to specify a size of an acceptable input area within which a menu may be drawn for the user in an ergonomic manner according to an embodiment of the invention.

FIG. 17 shows another way that the user may be allowed to define the size of the menu that will be drawn. Specifically, in the example shown in FIG. 17 the user initially places the pen tip at an initial pen position. The user is then instructed to touch the pen tip to the table in various positions shown using black dots. Depending on the implementation fewer pen touches (fewer black dots) may be sufficient to determine the active area in which to draw the menu. Likewise, rather than use pen touches, pen strokes may be used to determine the active area in which to draw the menu instead. The places that the user touches the table may be used directly to define the menu area or may be used to select one of a plurality of pre-configured menu areas for the user. In the example shown in FIG. 17, the menu area has been drawn to coincide with the locations that the user touched the table. The system could, instead, use these pen touches to determine which of the areas shown in FIG. 16 should be used to draw a menu for the user.

Figure 18:
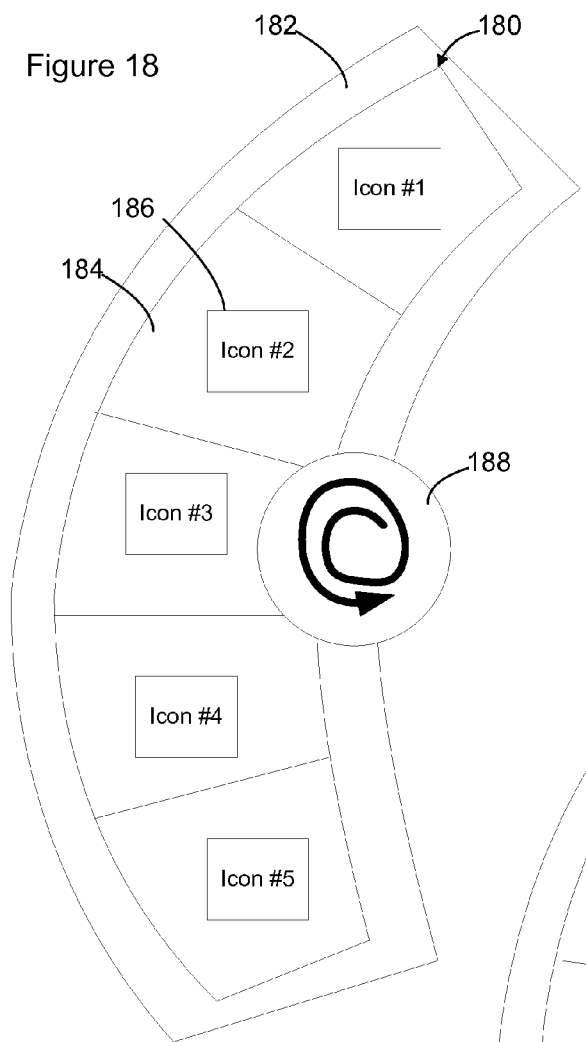
FIG. 18 shows an open pie menu according to an embodiment of the invention that has been drawn within a reachable area for a user.

FIG. 18 shows an open pie menu 180 according to an embodiment of the invention that has been drawn within a reachable area 182 for a user. The open pie menu is formed to have a point-and-click regions 184 that extend in an arc to follow the general shape of the outside of the reachable area. Icons 186 are drawn in the point-and-click regions 184 to convey the function of the region to the user. A gesture area 188 is provided as well and, in this design, is disposed within an area that would be expected to be occluded by the user's hand when the user interacts with the menu. The gesture area may be used to cause the function of the point-and click regions within the interactive area to change or to enable other types of gesture based interaction between the user and the functions supported by the menu.

If the user selects one of the functions, and selection of the function requires a subfunction menu to be drawn for the user, the initial menu of functions may be replaced or, alternatively, the sub-function menu may be drawn over the top of the current function menu. Since the goal is to provide the user with an easy-to-reach palate of functions, the sub-function menu should also be drawn at least partially within the reachable area 182. Although a portion of the sub-function menu may extend out of the reachable area, the sub-function menu should extend at least partially into the reachable area so that each sub-function included in the subfunction menu is able to be selected by the user without requiring the user to move his hand.

Figure 19:
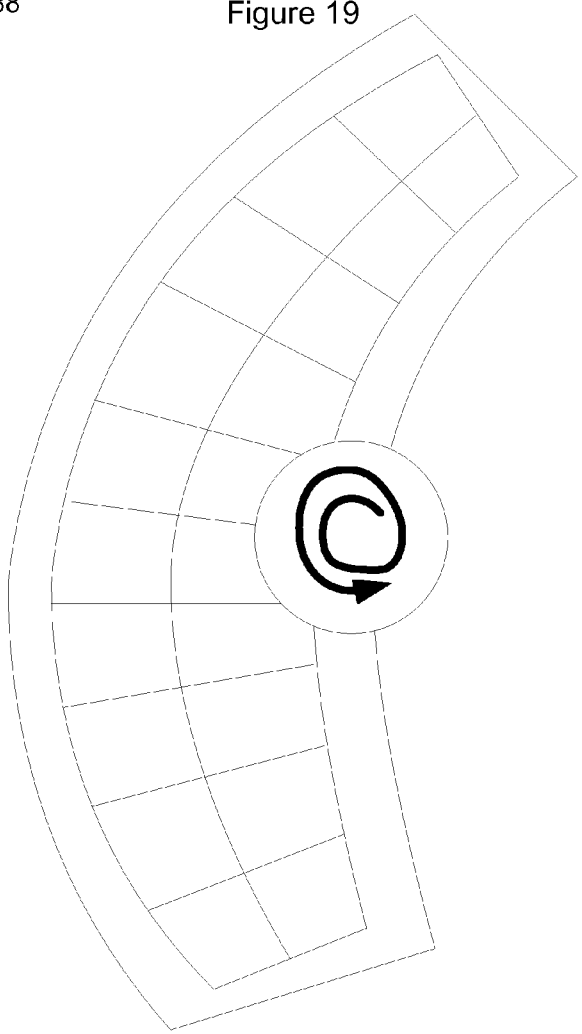
FIG. 19 shows an embodiment of a menu design with two rows of point-and-click regions.

In the example shown in FIG. 18 the circle segment of functions includes a single row of point-and-click regions extending in an arc about the user's hand. The invention is not limited in this manner as multiple rows of point-and-click regions may be included. For example, FIG. 19 shows an embodiment with two rows of point-and-click regions. Thus, the menu may include one, two, or more rows of point-and-click regions supporting functions available via the menu.

Figure 20:
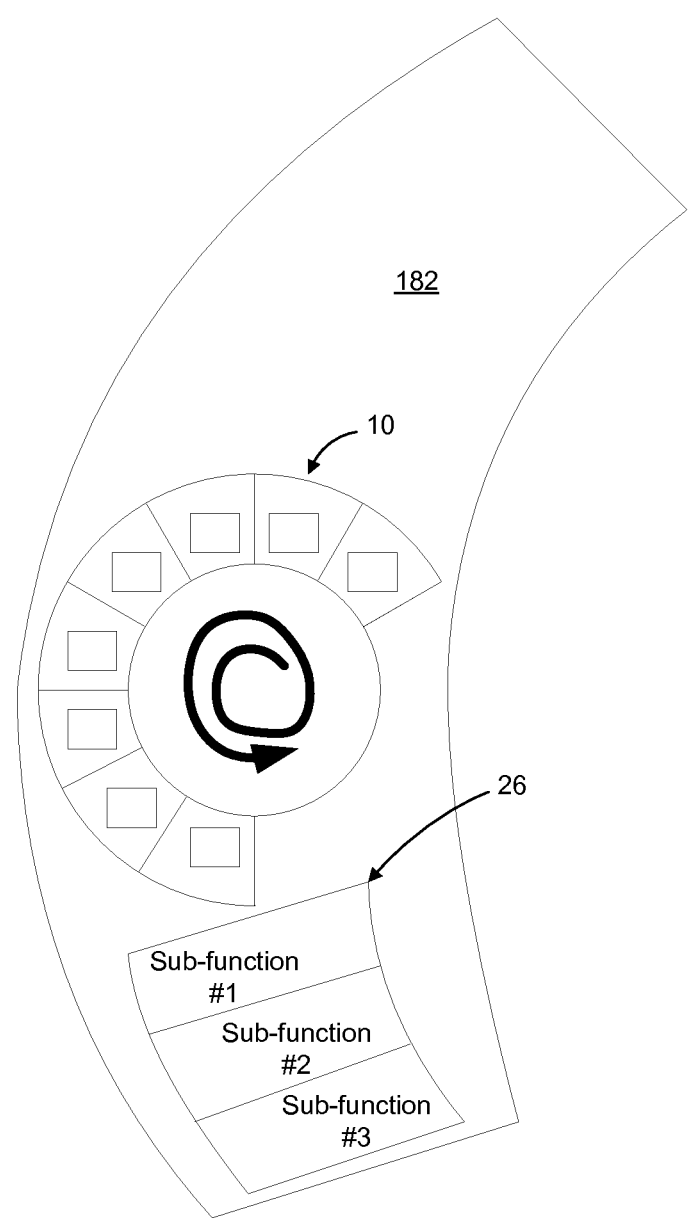
FIG. 20 shows an embodiment of the invention in which a modified pie menu of FIG. 4 has been drawn within the reachable region surrounding an initial pen placement.

FIG. 20 shows an example in which a modified pie menu of FIG. 4 has been drawn within the reachable region surrounding the initial pen placement. As shown in FIG. 20, the menu 10 and any sub-function menu 26 should be drawn within the reachable area 182 to make those functions and sub-functions easily reachable for the user without requiring the user to move his hand.

As described in greater detail above, embodiments of the invention utilize open pie-shaped menus that avoid placing interactive regions in areas that are expected to be occluded by the user's hand while the user interacts with the menu. Depending on the handedness of the user, buttons that invoke an action that shows feedback in the pie menu should be placed on the side of the menu that prevents occlusions of the menu items. Additionally, according to an embodiment, the standard functionality of a menu including point-and-click regions is extended to include interactive gesture areas to enable gesture-based interaction between the user and the menu.

The gesture area interprets a set of gestures that further invoke actions. Since visual feedback is not required for the user to interact with the gesture area, the gesture area can be placed in partly occluded regions. Preferably the gesture area is provided at the pen's initial location when the menu is invoked to facilitate instant use of gestures.

Submenus should not be drawn significantly outside the reachable area of the user and, accordingly, should be stacked or otherwise drawn to be reachable by the users. Likewise, the submenus should not be drawn in occluded areas since interaction between the user and the submenu requires visual feedback for the user to select the proper sub-function. Further, since the position of occluded area depends on the location of the hand/pen, a placement below the parent item is favorable for both vertical and horizontal displays to be visible to the user. Thus, according to one embodiment the sub-menus are drawn on top of the original point-and-click region. Whenever the user is clicking to the main menu again, the submenu should fade out and disappear.

In addition to using menus formed directly on the large digital surface, a separate tangible palette may also be used to access a limited set of menu items. In this embodiment, instead of activating a pie menu on screen and then selecting an option from the menu, the item is put directly on a shortcut palette. A tangible palette is a hardware device containing an interactive screen via which the user may select functions to be implemented on the large digital surface. The palette can be used with the same pen as the digital whiteboard, so that the user is not required to switch devices to select menu items on the separate tangible palette. The pie menu on the whiteboard still can be used with its full functionality. The palette is an additional tool for frequently performed actions that can be more quickly invoked without first having to activate a pie menu.

Figure 21:
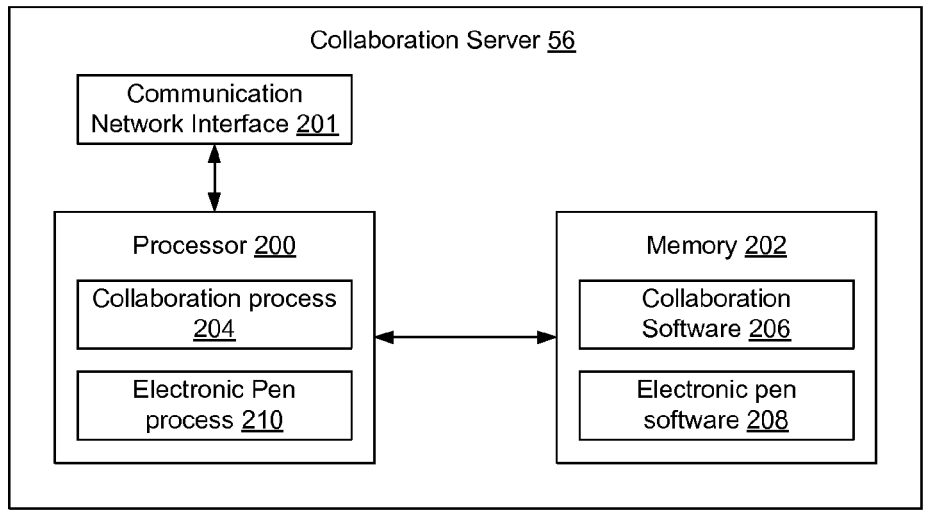
FIG. 21 is a functional block diagram of a collaboration server designed to implement at least a portion of the collaboration system according to an embodiment of the invention.

FIG. 21 shows an example collaboration server 56 that may be used in connection with an embodiment of the invention.

In the embodiment shown in FIG. 21, the collaboration server is configured as a normal computer server and includes a processor 200 and memory 202. The collaboration server also includes other supporting circuitry such as network interface 201 and other common components (not shown).

In the embodiment shown in FIG. 21, the memory includes collaboration software 206 and electronic pen software 208. These software components contain data and instructions which, when loaded into the processor 200, cause the processor 200 to implement collaboration process 204 and electronic pen process 210. These processes allow the collaboration server to receive input from electronic pen and incorporate the writing from the electronic pen into the collaboration session hosted by the collaboration server via collaboration process 204. The collaboration process and electronic pen process further implement the functions described above in connection with establishing collaboration sessions and enabling the users to interact with collaboration sessions using electronic pens.

Figure 22:
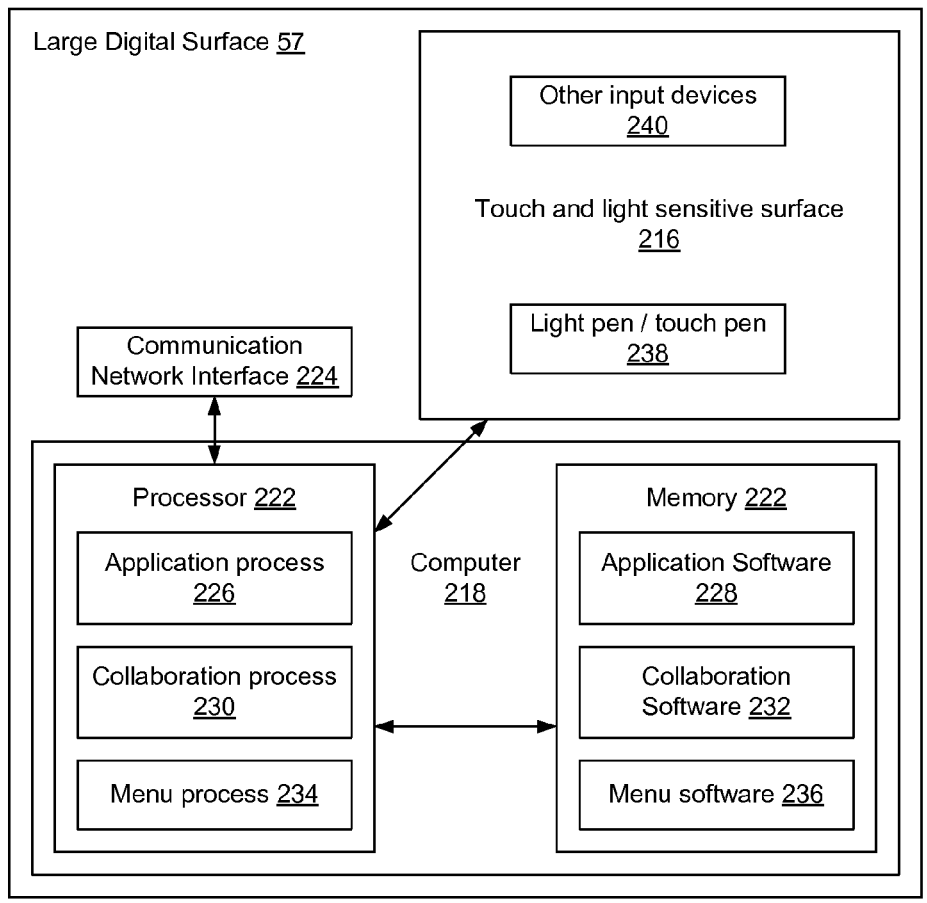
FIG. 22 is a functional block diagram of a large digital surface designed to implement at least a portion of the collaboration system according to an embodiment of the invention.

FIG. 22 shows an example large digital surface 57 that may be used in connection with an embodiment of the invention. In the embodiment shown in FIG. 22, the large digital surface is configured to include a large light/touch sensitive digital surface 216 and an associated computer 218. The large light/touch sensitive surface 216 provides a user interface that can present information to the users as well as receive input from users. The surface 216 may be vertical and mounted on a wall to be used in place of a conventional white board, or may be horizontally mounted for example as a table surface.

The particular manner in which users can interact with the large light and touch sensitive surface will depend on the technology used to implement the digital surface. For example, if the surface 216 is pressure or light sensitive, users may use a stylus to press on the surface or use a light pen 238 to interact with the surface. These types of devices may be used to interact with content shown on the surface 216 to select particular content, move content around, add content, and otherwise provide input via the surface 216 to the computer system.

The computer system 218 supporting the surface 216 may be implemented as a normal computer and includes a processor 220 and memory 222. The computer 218 also includes other supporting circuitry such as network interface 224 and other components commonly utilized to enable the computer to operate appropriately (not shown).

In the embodiment shown in FIG. 22, the memory 222 includes application software 228, collaboration software 232, and menu software 236. These software components contain data and instructions which, when loaded into the processor 220, cause the processor 220 to implement application process 226, collaboration process 230, and menu process 234. The application process is a process that supports data collection and manipulation on the surface 216. For example, application software 228 may be a whiteboard software package to enable a whiteboard application process to be instantiated in processor 220. Users interact with the whiteboard process by drawing on the surface 216, moving content, etc. The electronic whiteboard process in this instance provides the underlying support to enable the surface to be used in this manner. Other application processes such as PhotoShop, PowerPoint, and other common applications may be utilized as well.

The collaboration 230 enables the large digital surface 57 to interact with a collaboration server 56 to receive input from remote users. The remote users, in this embodiment, are not physically located in the room with the surface 216 and hence cannot interact with the surface 216 by touching the surface.

Collaboration process 230 facilitates network-based interaction to enable remote users to interact with the content being shown on the surface as if they were physically present. For example, as discussed above, users may use digital pens to add content to the content being shown on the surface 216 and to move content around on the surface 216. Other types of remote interaction may be supported as well, such as mouse and keyboard based interaction by a user at a remote terminal.

In the example shown in FIG. 22, the menu process 234 enables the processor to draw menus for users on the surface 216 upon occurrence of a menu invoking action. The menu process has been shown as a separate process in this embodiment to separate the functionality associated with drawing menus from the functionality associated with the underlying application supporting the surface 216 or any applications running on the surface 216. By separating the menu functionality into a separate component the menus of those applications (which may be standard Windows bar menus) are not required to be changed. Rather, the menu process can replace the standard menus with the adaptive pie menus and adaptive open-pie menus described herein. Over time, the application processes may incorporate the functionality of the menu process enabling that component or the functionality of that component to be implemented in other processes running on the processor 220.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

The invention claimed is:

1. A collaboration system, comprising:
    an electronic pen configured to enable a user to write on paper such that what the user is writing while using the electronic pen is visible on the paper, the electronic pen further being configured to record information about strokes made by the user while writing; and
    a collaboration server including a storage medium, the collaboration server configured to:
        establish a collaboration session displayable on a digital surface;
        receive input from the electronic pen over a communication network and store the input from the electronic pen on the storage medium;
        process the input from the electronic pen to recreate what the user was writing while using the electronic pen; and
        cause the recreated writing to be shown during the collaboration session on the digital surface;
        wherein, in response to the user of the digital surface invoking a menu, the digital surface is configured to display the menu, wherein the menu is a pie-shaped menu having an input area, the input area extending in a circular segment extending less than 360 degrees such that no portion of the input area is disposed in an area expected to be occluded by the user's hand when the user interacts with the menu.

2. The collaboration system of claim 1, wherein the collaboration server is further configured to store the recreated writing and the collaboration session.

3. The collaboration system of claim 1, wherein one or more applications are configured to be run on the digital surface, and wherein the menu is configured to control the one or more applications.

4. The collaboration system of claim 3, further comprising a hardware device comprising an interactive screen, and wherein users of the digital surface are able to invoke a menu associated with the one or more applications by interacting with the interactive screen to cause the menu associated with the one or more applications to be drawn on the digital surface.

5. The collaboration system of claim 1, wherein the menu is invokable via the electronic pen with a single down action and two press actions within a defined period of time.

6. The collaboration system of claim 1, wherein the menu is centered approximately at the location where the menu was invoked.

7. The collaboration system of claim 1, wherein the area expected to be occluded extends approximately 90 degrees.

8. The collaboration system of claim 1, wherein an orientation of the area expected to be occluded is based on a direction vector between a location where the menu was invoked and a location of contact between the digital surface and the user's hand.

9. The collaboration system of claim 8, wherein the location where the menu is invoked is a tip of the electronic pen contacts the digital surface.

10. The collaboration system of claim 8, wherein, in response to the user invoking the menu without any contact between the user's hand and the digital surface, the orientation of the area expected to be occluded is established using a default value.

11. The collaboration system of claim 8, wherein, in response to the user invoking the menu without any contact between the user's hand and the digital surface, the orientation of the area expected to be occluded is established using a previous direction vector from a previous menu invocation.

12. The collaboration system of claim 8, wherein the direction vector enables the area expected to be occluded to be adjusted based on the user's posture.

13. The collaboration system of claim 8, wherein the direction vector enables the server to distinguish between right-handed users and left-handed users, and enables the collaboration server to automatically generate a right-handed menu for a right-handed user and a left-handed menu for a left-handed user.

14. The collaboration system of claim 1, wherein the menu further has a gesture area, configured to enable the user to provide gesture based input.

15. The collaboration system of claim 14, wherein the gesture area extends into the area expected to be occluded.

16. The collaboration system of claim 15, wherein the gesture area enables functions associated with the input area to be moved between regions of the input area.

17. The collaboration system of claim 16, wherein the gesture area enables new functions to be associated with the regions of the input area.

18. The collaboration system of claim 1, wherein the user is remotely located from the digital surface.

* * * * *

UNITED STATES PATENT AND TRADEMARK OFFICE
CERTIFICATE OF CORRECTION

| | | |
|---|---|---|
| PATENT NO. | : 9,207,833 B2 | Page 1 of 1 |
| APPLICATION NO. | : 13/779058 | |
| DATED | : December 8, 2015 | |
| INVENTOR(S) | : Doray et al. | |

It is certified that error appears in the above-identified patent and that said Letters Patent is hereby corrected as shown below:

In the claims,

Claim 9, col. 16, line 37, please delete "is a tip" and insert --is a location where a tip--.

Signed and Sealed this
Nineteenth Day of April, 2016

Michelle K. Lee
*Director of the United States Patent and Trademark Office*